(12) United States Patent
Liu et al.

(10) Patent No.: US 12,210,212 B2
(45) Date of Patent: Jan. 28, 2025

(54) OPTICAL IMAGING LENS PROOFED AGAINST FIELD CURVATURES, AND IMAGING MODULE AND ELECTRONIC DEVICE USING THE OPTICAL IMAGING LENS

(71) Applicant: HON HAI PRECISION INDUSTRY CO., LTD., New Taipei (TW)

(72) Inventors: Hsing-Chen Liu, New Taipei (TW); Gwo-Yan Huang, New Taipei (TW); Chia-Chih Yu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 485 days.

(21) Appl. No.: 17/577,123

(22) Filed: Jan. 17, 2022

(65) Prior Publication Data

US 2022/0252829 A1 Aug. 11, 2022

(30) Foreign Application Priority Data

Feb. 9, 2021 (CN) .......................... 202110180593.4

(51) Int. Cl.
*G02B 13/00* (2006.01)
*G02B 9/62* (2006.01)

(52) U.S. Cl.
CPC ........... *G02B 9/62* (2013.01); *G02B 13/0045* (2013.01)

(58) Field of Classification Search
CPC .......... G02B 9/62; G02B 9/64; G02B 13/002; G02B 13/0045; G02B 13/001; G02B 13/18

See application file for complete search history.

(56) References Cited

U.S. PATENT DOCUMENTS

| | | | |
|---|---|---|---|
| 2015/0277085 A1* | 10/2015 | Noda | G02B 9/62 359/713 |
| 2016/0266355 A1* | 9/2016 | Jang | G02B 3/04 |
| 2018/0045914 A1* | 2/2018 | Park | G02B 13/0045 |
| 2018/0164547 A1* | 6/2018 | Fang | G02B 9/62 |
| 2022/0252829 A1* | 8/2022 | Liu | G02B 13/18 |

FOREIGN PATENT DOCUMENTS

| | | |
|---|---|---|
| CN | 107918185 A | 4/2018 |
| TW | 201312154 A1 | 3/2013 |

* cited by examiner

*Primary Examiner* — George G. King
*Assistant Examiner* — Anna Smith
(74) *Attorney, Agent, or Firm* — ScienBiziP, P.C.

(57) ABSTRACT

An optical imaging lens proofed against field curvatures, in an imaging module, and the module being used in an electronic device, is, from an object side to an image side, composed of a first lens with a positive refractive power, a second lens, a third lens, a fourth lens with a negative refractive power, a fifth lens, and a sixth lens with a negative refractive power. The optical imaging lens satisfies the formula $-3 \text{ mm}^{-1} < \text{FNO}/f6 < -0.1 \text{ mm}^{-1}$, $-0.065 \text{ mm}/° < f6/\text{FOV} < -0.03 \text{ mm}/°$, wherein FNO is a F-number of the optical imaging lens, f6 is a focal length of the sixth lens, and FOV is a maximum field of view of the optical imaging lens.

18 Claims, 11 Drawing Sheets

OPTICAL IMAGING LENS PROOFED AGAINST FIELD CURVATURES, AND IMAGING MODULE AND ELECTRONIC DEVICE USING THE OPTICAL IMAGING LENS

FIELD

The subject matter relates to optical technologies, and more particularly, to an optical imaging lens, an imaging module having the optical imaging lens, and an electronic device having the imaging module.

BACKGROUND

Portable electronic devices, such as vehicles, tablet computers, and mobile phones, may be equipped with optical imaging lenses. The optical imaging lens may include five or six individual lenses. The optical imaging lens having six lenses has a higher image resolution ability, but may generate field curvatures. The ability to converge rays and correct distortions may also be poor. Thus, the optical imaging lens cannot meet requirements of high-order imaging quality.

BRIEF DESCRIPTION OF THE DRAWINGS

Implementations of the present technology will now be described, by way of example only, with reference to the attached figures.

DETAILED DESCRIPTION

Figure 1:
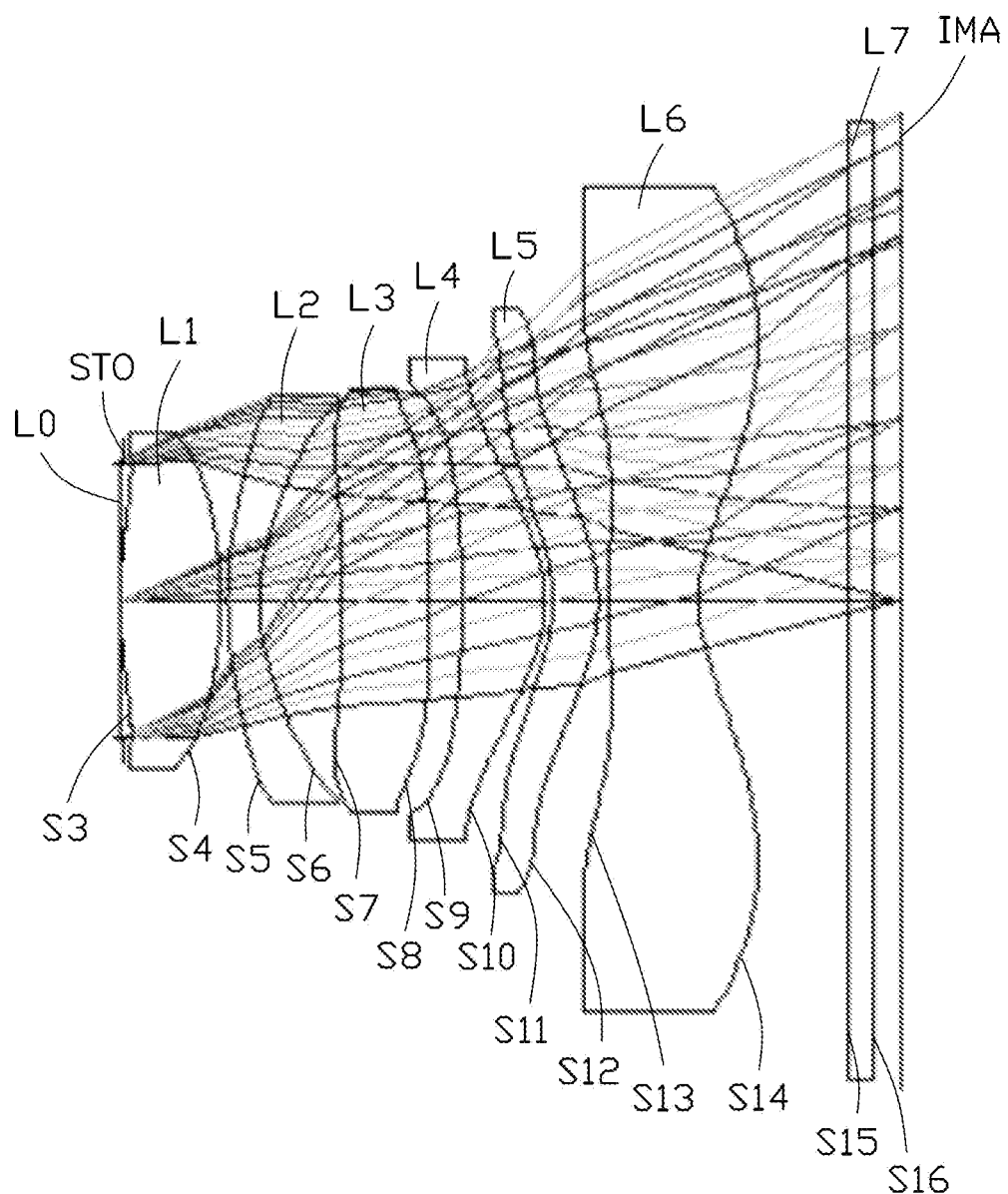
FIG. 1 is a diagrammatic view of a first embodiment of an optical imaging lens according to the present disclosure.

It will be appreciated that for simplicity and clarity of illustration, where appropriate, reference numerals have been repeated among the different figures to indicate corresponding or analogous components. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

Referring to FIG. 1, an embodiment of an optical imaging lens 10 is provided. The optical imaging lens 10 includes, in a direction from an object side to an image side, a first lens L1 with a positive refractive power, a second lens L2, a third lens L3, a fourth lens L4 with a negative refractive power, a fifth lens L5, a sixth lens L6 with a negative refractive power, and an infrared filter L7. The refractive powers of the second lens L2, the third lens L3, and the fifth lens L5 are not limited in the present disclosure.

The first lens L1 has an object surface S3 and an image surface S4. The second lens L2 has an object surface S5 and an image surface S6. The third lens L3 has an object surface S7 and an image surface S8. The fourth lens L4 has an object surface S9 and an image surface S10. The fifth lens L5 has an object surface S11 and an image surface S12. The sixth lens L6 has an object surface S13 and an image surface S14. A virtual surface L0 may be arranged on the object surface S1 of the first lens L1.

The optical imaging lens 10 satisfies following formula (1):

$$-3 \text{ mm}^{-1} < \text{FNO}/f6 < -0.1 \text{ mm}^{-1}, 0.065 \text{ mm}/^\circ < f6/\text{FOV} < -0.03 \text{ mm}/^\circ. \quad \text{(formula (1))}$$

Wherein, FNO is the F-number of the optical imaging lens 10, f6 is a focal length of the sixth lens L6, and FOV is a maximum field of view of the optical imaging lens 10.

By designing the relationship among the F-number, the effective focal length of the sixth lens L6, and the field of view, the optical imaging lens 10 can obtain images of high resolution across a large field of view, and the imaging quality is improved. By distributing lenses with positive refractive power apart from the lens with negative refractive power, field curvatures can be avoided, and high-order imaging quality can be met.

In some embodiments, the image surface S4 of the first lens L1 is convex. The image surface S8 of the third lens L3 is convex. The image surface S14 of the sixth lens L6 is concave near the near optical axis. The object surface S13 and the image surface S14 of the sixth lens L6 are aspherical, and at least one of the object surface S13 and the image surface S14 has at least one inflection point.

In some embodiments, the optical imaging lens 10 satisfies following formula (2):

$$0.5 \text{ mm}^{-1} < \tan(\text{HFOV})/\text{SD11} < 1.5 \text{ mm}^{-1}. \quad \text{(formula (2))}$$

Wherein, HFOV is half of the maximum field of view of the optical imaging lens 10, and SD11 is an effective semi-diameter of the object surface S3 of the first lens L1. The first lens L1, in satisfying the above formula, allows the optical imaging lens 10 to have a larger field of view and a shorter total track length. The optical imaging lens 10 can have a compact structure, which can be applied in a small electronic device. When tan (HFOV)/SD11<0.5 mm$^{-1}$, the effective semi-diameter of the object surface S3 of the first lens L1 is too large, which increases a size of aperture of the optical imaging lens 10 adjacent to the object side. When tan (HFOV)/SD11>1.5 mm$^{-1}$, the field of view of the optical imaging lens 10 is too large, and the optical imaging lens 10 has an insufficient ability to collect rays, resulting in a poor imaging quality.

In some embodiments, the optical imaging lens 10 satisfies following formula (3):

$$1.12<SD22/SD12<1.2. \quad \text{(formula (3))}$$

Wherein, SD22 is an effective semi-diameter of the image surface S6 of the second lens L2, and SD12 is an effective semi-diameter of the image surface S4 of the first lens L1. When the above formula is satisfied, the size of the aperture of the optical imaging lens 10 adjacent to the object side can be reduced.

In some embodiments, the optical imaging lens 10 satisfies following formula (4):

$$1.3<(CT1+CT2)/(T12+T23)<1.6. \quad \text{(formula (4))}$$

Wherein, CT1 is the distance from the object surface S3 of the first lens L1 to the image surface S4 of the first lens L1 along the optical axis, CT2 is the distance from the object surface S5 of the second lens L2 to the image surface S6 of the second lens L2 along the optical axis, and T12 is the distance between the image surface S4 of the first lens L1 and the object surface S5 of the second lens L2 along the optical axis. T23 is the distance between the image surface S6 of the second lens L2 and the object surface S7 of the third lens L3 along the optical axis. When the above formula is satisfied, enough space exists between the first lens L1 and the second lens L2 or between the second lens L2 and the third lens L3 during assembly, avoiding contact or collision between lenses. In addition, the increase of CT1 and CT2 can increase the depth of the optical imaging lens 10 adjacent to the object side, and also reduce the sensitivity of the optical imaging lens 10.

In some embodiments, the optical imaging lens 10 satisfies following formula (5):

$$35<vd3-vd2<40. \quad \text{(formula (5))}$$

Wherein, vd2 is the Abbe number of the second lens L2, and vd3 is the Abbe number of the third lens L3. By choosing suitable material of the lenses to satisfy the above formula, the color difference of optical imaging lens 10 can be corrected, which can improve the imaging resolution and the imaging quality of optical imaging lens 10.

In some embodiments, the optical imaging lens 10 satisfies following formula (6):

$$1.4<|RS7+RS8|/|RS7-RS8|<2.0. \quad \text{(formula (6))}$$

Wherein, RS7 is a radius of curvature of the object surface S9 of the fourth lens L4 near the optical axis, and RS8 is a radius of curvature of the image surface S10 of the fourth lens L4 near the optical axis. The radius of curvature of the fourth lens L4 affects the degree of curving of the fourth lens L4. When the above formula is satisfied, marginal aberration of the optical imaging lens 10 can be corrected, and astigmatism can be suppressed. The angle of the chief rays from the peripheral field into the image plane can be reduced.

In some embodiments, the optical imaging lens 10 satisfies following formula (7):

$$1.7<|R5|/CT3<2.0. \quad \text{(formula (7))}$$

Wherein, R5 is a radius of curvature of the object surface S7 of the third lens L3 near the optical axis, and CT3 is a distance from the object surface S7 of the third lens L3 to the image surface S8 of the third lens L3 along the optical axis. By satisfying the above formula, the rays can be converged, the surface of the third lens L3 can be smooth, and deviation of incident angle and exit angle of rays in different fields of view can be reduced, so as to reduce the sensitivity. Since the third lens L3 is thicker, the difficulty of processing and the tolerance sensitivity can be reduced, and yield can be improved.

In some embodiments, the optical imaging lens 10 also includes a stop STO disposed on a surface of any one of the lenses. The stop STO can also be disposed before the first lens L1. The stop STO can also be sandwiched between any two lenses. For example, as shown in FIG. 1, the stop STO is disposed on the object surface S3 of the first lens L1. The stop STO can be a glare stop or a field stop, and can reduce stray rays and improve the image quality.

In some embodiments, the optical imaging lens 10 also includes an infrared filter L7 having an object surface S15 and an image surface S146. The infrared filter L7 is arranged on the image surface S12 of the fifth lens L5. The infrared filter L7 can filter visible rays and only allow infrared rays to pass through, so that the optical imaging lens 10 can also be used in a dark environment.

First Embodiment

Referring to FIG. 1, the optical imaging lens 10 includes, from the object side to the image side, a stop STO, a first lens L1 with a positive refractive power, a second lens L2, a third lens L3, a fourth lens L4 with a negative refractive power, a fifth lens L5, a sixth lens L6 with a negative refractive power, and a filter L7.

The object surface S3 of the first lens L1 is convex near the optical axis, and the image surface S4 of the first lens L1 is convex near the optical axis. The object surface S5 of the second lens L2 is convex near the optical axis, and the image surface S6 is concave of the second lens L2 near the optical axis. The object surface S7 of the third lens L3 is concave near the optical axis, and the image surface S8 of the third lens L3 is convex near the optical axis. The object surface S9 of the fourth lens L4 is concave near the optical axis, and the image surface S10 of the fourth lens L4 is convex near the optical axis. The object surface S11 of the fifth lens L5 is concave near the optical axis, and the image surface S12 of the fifth lens L5 is convex near the optical axis. The object surface S13 of the sixth lens L6 is convex near the optical axis, and the image surface S14 of the sixth lens L6 is concave near the optical axis. The object surface S13 and the image surface S14 of the sixth lens L6 are aspheric, and at least one of the object surface S13 and the image surface S14 has at least one inflection point.

When the optical imaging lens 10 is used, rays from the object side enter the optical imaging lens 10, successively pass through the stop STO, the first lens L1, the second lens L2, the third lens L3, the fourth lens L4, the fifth lens L5, the sixth lens L6, and the infrared filter L7, and finally converge on the image plane IMA.

Table 1 shows characteristics of the optical imaging lens 10. The reference wavelength of focal length, refractive index, and Abbe number is 555 nm, and the units of radius of curvature, thickness, and semi-diameter are in millimeters (mm).

TABLE 1

First embodiment, FNO = 2.05, FOV = 78°

| surface | lens | type of surface | radius of curvature | thickness | material | refractive index | Abbe number | semi-diameter | conic constant |
|---|---|---|---|---|---|---|---|---|---|
| OBJ | | standard surface | infinite | infinite | | | | infinite | 0.000 |
| S1 | | standard surface | infinite | 0.016 | | | | 1.048 | 0.000 |
| STO | | standard surface | infinite | −0.016 | | | | 1.034 | 0.000 |
| S3 | first lens | aspheric | 3.780 | 0.755 | glass | 1.53 | 55.6 | 1.088 | −7.848 |
| S4 | | aspheric | −2.761 | 0.050 | | | | 1.261 | −22.904 |
| S5 | second lens | aspheric | 3.030 | 0.241 | glass | 1.67 | 19.2 | 1.529 | −12.099 |
| S6 | | aspheric | 1.538 | 0.617 | | | | 1.503 | −7.422 |
| S7 | third lens | aspheric | −30.000 | 0.657 | glass | 1.53 | 55.6 | 1.593 | −40.000 |
| S8 | | aspheric | −29.000 | 0.250 | | | | 1.560 | −40.000 |
| S9 | fourth lens | aspheric | −5.607 | 0.613 | glass | 1.53 | 55.6 | 1.624 | 0.461 |
| S10 | | aspheric | −1.060 | 0.060 | | | | 1.807 | −3.019 |
| S11 | fifth lens | aspheric | −1.270 | 0.341 | glass | 1.67 | 19.2 | 2.027 | −4.825 |
| S12 | | aspheric | −1.316 | 0.080 | | | | 2.197 | −5.949 |
| S13 | sixth lens | aspheric | 7.541 | 0.670 | glass | 1.53 | 55.6 | 2.646 | 3.095 |
| S14 | | aspheric | 1.021 | 1.113 | | | | 3.092 | −5.357 |
| S15 | infrared filter | standard surface | infinite | 0.200 | glass | 1.52 | 64.2 | 3.600 | 0.000 |
| S16 | | standard surface | infinite | 0.200 | | | | 3.600 | 0.000 |
| IMA | | standard surface | infinite | | | | | 3.662 | 0.000 |

Wherein, EFL is the effective focal length of the optical imaging lens 10, FNO is the F-number of the optical imaging lens 10, and FOV is the field of view of the optical imaging lens 10.

TABLE 2

First embodiment

| surface | K2 | K4 | K6 | K8 | K10 | K12 | K14 |
|---|---|---|---|---|---|---|---|
| S3 | 0.000E+00 | −8.619E−03 | −1.900E−02 | −2.400E−02 | 4.600E−02 | −4.400E−02 | 1.300E−02 |
| S4 | 0.000E+00 | −2.400E−02 | −5.400E−02 | 2.600E−02 | 5.060E−03 | −1.300E−02 | 3.726E−03 |
| S5 | 0.000E+00 | 1.200E−02 | −1.600E−02 | 1.800E−02 | −1.600E−02 | 8.466E−03 | −1.538E−03 |
| S6 | 0.000E+00 | 4.400E−02 | −5.293E−03 | 2.048E−03 | −8.756E−03 | 6.862E−03 | −1.451E−03 |
| S7 | 0.000E+00 | −5.200E−02 | 1.100E−02 | 1.400E−02 | −2.428E−03 | −2.440E−04 | 2.050E−05 |
| S8 | 0.000E+00 | −3.200E−02 | −1.100E−02 | 4.195E−03 | −2.563E−03 | 1.150E−03 | −5.299E−05 |
| S9 | 0.000E+00 | 2.300E−02 | −5.793E−03 | −1.100E−02 | 5.060E−03 | −1.200E−03 | 1.000E−04 |
| S10 | 0.000E+00 | 3.000E−02 | −3.218E−03 | −2.474E−04 | 1.631E−05 | 1.454E−05 | 1.573E−05 |
| S11 | 0.000E+00 | 3.000E−02 | −3.625E−04 | −2.351E−04 | 7.843E−05 | −4.775E−05 | 1.211E−06 |
| S12 | 0.000E+00 | −2.400E−02 | 2.000E−02 | −4.446E−03 | 9.871E−04 | −2.021E−04 | 1.426E−05 |
| S13 | 0.000E+00 | −6.700E−02 | 9.244E−03 | 6.843E−04 | −1.416E−04 | −8.442E−06 | 1.349E−06 |
| S14 | 0.000E+00 | −3.600E−02 | 7.814E−03 | −1.186E−03 | 8.097E−05 | −3.855E−07 | −1.300E−07 |

It should be noted that the object surface and the image surface of each lens of the optical imaging lens 10 are aspherical. The aspherical equation of each aspherical surface is according to following formula (8) as follows:

$$Z = \frac{cr^2}{1+\sqrt{1-(k+1)c^2r^2}} + Ar^4 + Br^6 + Cr^8 + Dr^{10} + Er^{12} + Fr^{14} + Gr^{16} + \cdots$$

Wherein, Z represents a height of the surface parallel to Z axis, R represents a radial distance starting from the vertex of the surface, C represents the curvature at the vertex, K represents the conic constant, and K4, K6, K8, K10, K12 and K14 represent aspherical coefficients of fourth-order, sixth-order, eighth-order, tenth-order, and twelfth-order, respectively. The aspherical coefficients are shown in Table 2.

Figure 2:
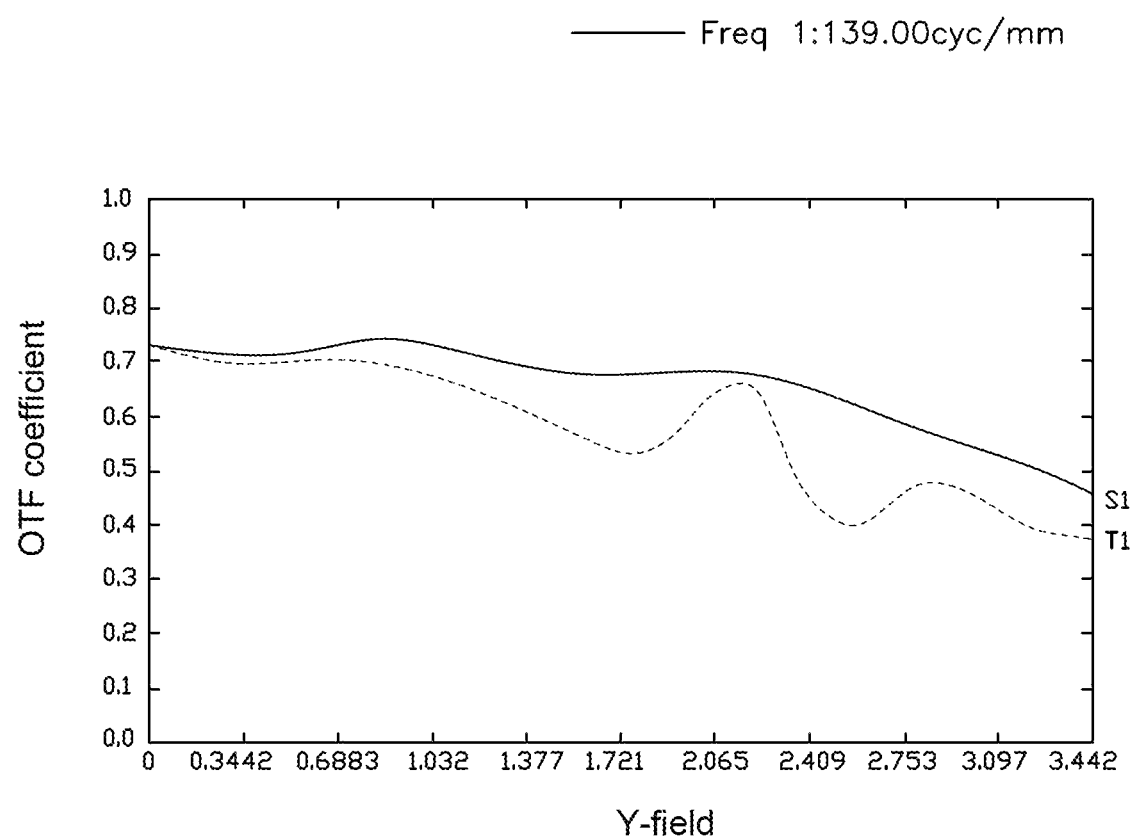
FIG. 2 is a diagram of Modulation Transfer Function (MTF) curves of the optical imaging lens of FIG. 1.
Figure 3:
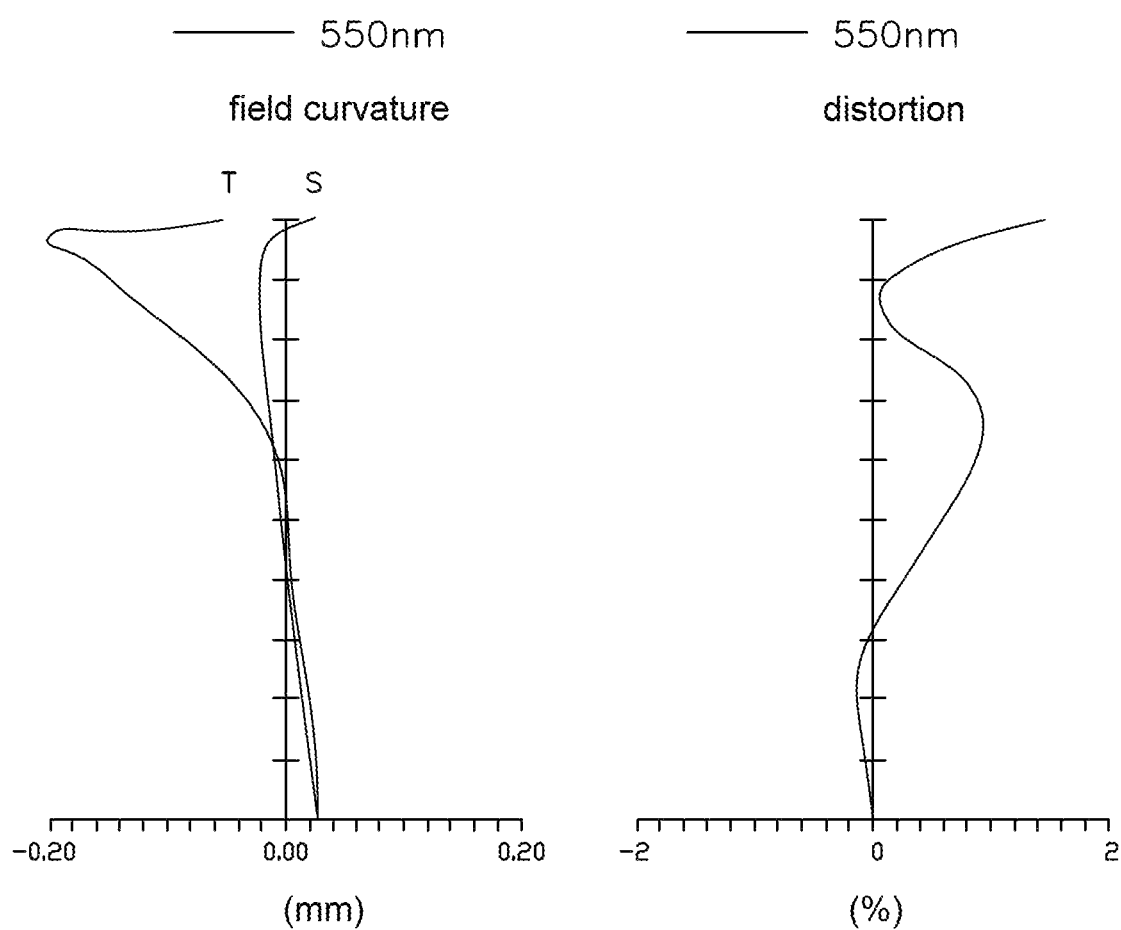
FIG. 3 is diagrams of field curvatures and distortions of the optical imaging lens of FIG. 1.

FIG. 2 is a diagram of MTF curves of the optical imaging lens 10, with a reference wavelength of 550 nm. The abscissa represents a Y-field offset angle, that is, the angle between the field of view of the optical system 10 and the optical axis. The ordinate represents the OTF coefficient. S1 and T1 represent curves at a spatial frequency of 139 p/mm, which can reflect contrast characteristics and resolution characteristics of the optical imaging lens 10. FIG. 3 shows field curvatures and distortions of the optical imaging lens 10, with a reference wavelength of 550 nm.

As shown in FIGS. 2 and 3, the sagittal field curvature and the meridional field curvature of the optical imaging lens 10 are controlled o be in a range of −0.2 mm to 0.2 mm, making manufacture of the lenses easier and cost reduced. The distortions of the optical imaging lens 10 are controlled to be in a range of 0% to 17%. Thus, deformation by the optical imaging lens 10 in images captured is small. Thus, the optical imaging lens 10 has an improved imaging quality.

Second Embodiment

Figure 4:
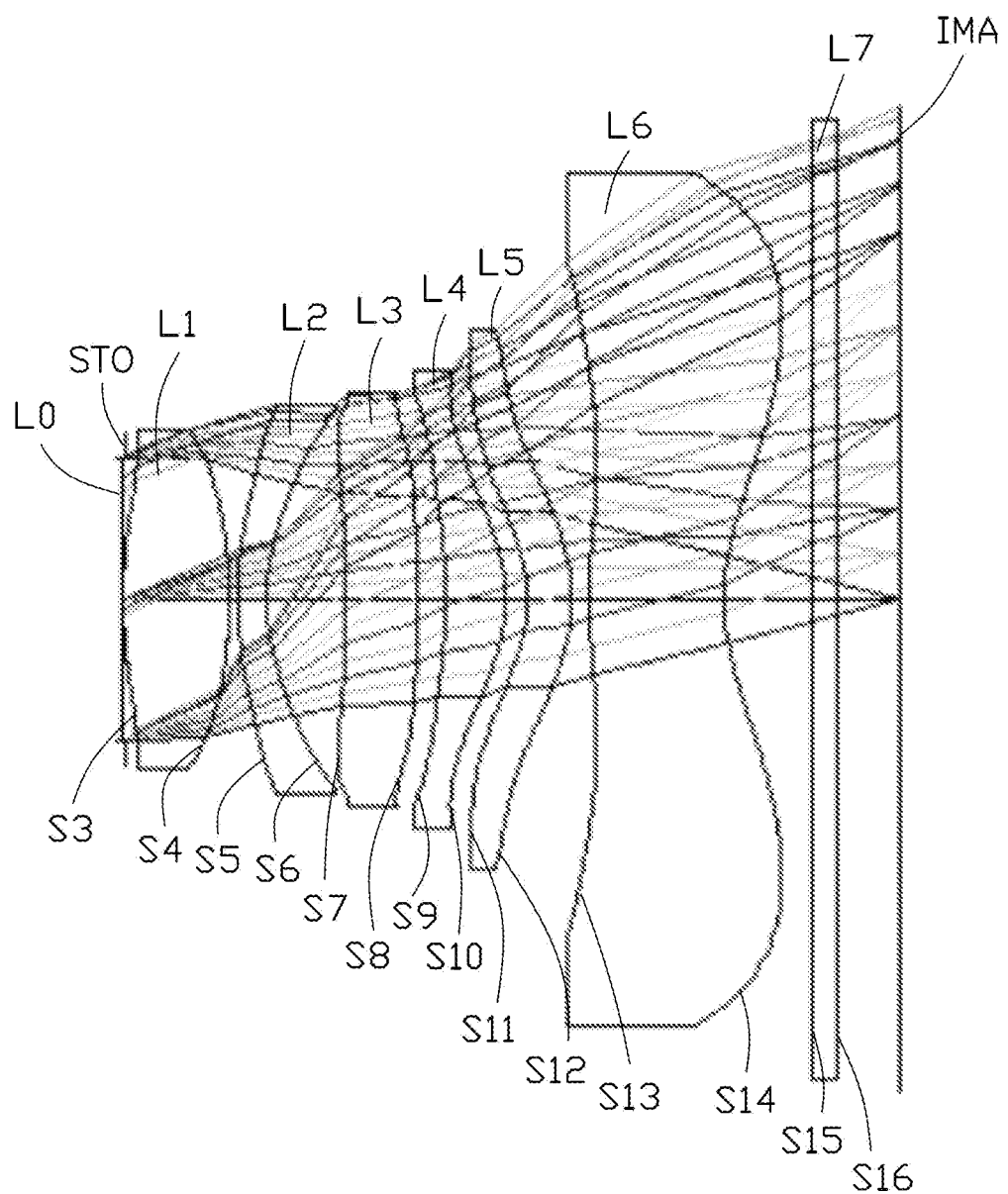
FIG. 4 is a diagrammatic view of a second embodiment of an optical imaging lens according to the present disclosure.

Referring to FIG. 4, the optical imaging lens 10 includes, from the object side to the image side, a stop STO, a first lens L1 with a positive refractive power, a second lens L2, a third lens L3, a fourth lens L4 with a negative refractive power, a fifth lens L5, a sixth lens L6 with a negative refractive power, and a filter L7.

The object surface S3 of the first lens L1 is convex near the optical axis, and the image surface S4 of the first lens L1 is convex near the optical axis. The object surface S5 of the second lens L2 is convex near the optical axis, and the image surface S6 of the second lens L2 is concave near the optical axis. The object surface S7 of the third lens L3 is concave near the optical axis, and the image surface S8 of the third lens L3 is convex near the optical axis. The object surface S9 of the fourth lens L4 is concave near the optical axis, and the image surface S10 of the fourth lens L4 is convex near the optical axis. The object surface S11 of the fifth lens L5 is concave near the optical axis, and the image surface S12 of the fifth lens L5 is convex near the optical axis. The object surface S13 of the sixth lens L6 is convex near the optical axis, and the image surface S14 of the sixth lens L6 is concave near the optical axis. The object surface S13 and the image surface S14 of the sixth lens L6 are aspheric, and at least one of the object surface S13 and the image surface S14 has at least one inflection point.

When the optical imaging lens 10 is used, rays from the object side enter the optical imaging lens 10, successively pass through the stop STO, the first lens L1, the second lens L2, the third lens L3, the fourth lens L4, the fifth lens L5, the sixth lens L6, and the infrared filter L7, and finally converge on the imaging plane IMA.

Table 3 shows characteristics of the optical imaging lens 10. The reference wavelength of focal length, refractive index, and Abbe number is 555 nm, and the units of radius of curvature, thickness and semi-diameter are in millimeters (mm).

TABLE 3

| surface | lens | type of surface | radius of curvature | thickness | material | refractive index | Abbe number | semi-diameter | conic constant |
|---|---|---|---|---|---|---|---|---|---|
| \multicolumn{10}{c}{Second embodiment, FNO = 2, FOV = 78°} |
| OBJ | | standard surface | infinite | infinite | | | | infinite | 0.000 |
| S1 | | standard surface | infinite | 0.016 | | | | 1.065 | 0.000 |
| STO | | standard surface | infinite | −0.016 | | | | 1.052 | 0.000 |
| S3 | first lens | aspheric | 3.590 | 0.799 | glass | 1.53 | 55.6 | 1.117 | −5.825 |
| S4 | | aspheric | −2.810 | 0.060 | | | | 1.279 | −25.237 |
| S5 | second lens | aspheric | 2.738 | 0.215 | glass | 1.67 | 19.2 | 1.465 | −12.113 |
| S6 | | aspheric | 1.456 | 0.593 | | | | 1.448 | −7.213 |
| S7 | Third lens | aspheric | −30.000 | 0.535 | glass | 1.53 | 55.6 | 1.516 | −50.000 |
| S3 | | aspheric | −29.000 | 0.217 | | | | 1.560 | −30.000 |
| S9 | fourth lens | aspheric | −3.775 | 0.453 | glass | 1.53 | 55.6 | 1.577 | −10.526 |
| S10 | | aspheric | −1.105 | 0.167 | | | | 1.712 | −3.613 |
| S11 | fifth lens | aspheric | −0.961 | 0.329 | glass | 1.67 | 19.2 | 1.900 | −4.040 |
| S12 | | aspheric | −1.251 | 0.132 | | | | 2.031 | −4.334 |
| S13 | sixth lens | aspheric | 4.638 | 1.003 | glass | 1.53 | 55.6 | 2.549 | 0.126 |
| S14 | | aspheric | 1.525 | 0.662 | | | | 3.190 | −4.658 |
| S15 | infrared filter | standard surface | infinite | 0.200 | glass | 1.52 | 64.2 | 3.600 | 0.000 |
| S16 | | standard surface | infinite | 0.471 | | | | 3.600 | 0.000 |
| IMA | | standard surface | infinite | | | | | 3.692 | 0.000 |

Wherein, EFL is the effective focal length of the optical imaging lens 10, FNO is the F-number of the optical imaging lens 10, and FOV is the field of view of the optical imaging lens 10.

Table 4 shows the aspherical coefficients of the object surface and the image surface of each lens of the optical imaging lens 10.

TABLE 4

| surface | K2 | K4 | K6 | K8 | K10 | K12 | K14 |
|---|---|---|---|---|---|---|---|
| \multicolumn{8}{c}{Second embodiment} |
| S3 | 0.000E+00 | −6.076E−03 | −1.400E−02 | −2.200E−02 | 4.700E−02 | −4.300E−02 | 1.300E−02 |
| S4 | 0.000E+00 | −1.500E−02 | −5.200E−02 | 2.500E−02 | 4.871E−03 | −1.200E−02 | 3.454E−03 |
| S5 | 0.000E+00 | 1.400E−02 | −1.500E−02 | 1.600E−02 | −1.600E−02 | 8.655E−03 | −1.556E−03 |
| S6 | 0.000E+00 | 4.200E−02 | −7.526E−03 | 2.418E−03 | −8.382E−03 | 6.728E−03 | −1.448E−03 |
| S7 | 0.000E+00 | −5.600E−02 | 1.000E−02 | 1.400E−02 | −1.830E−03 | −1.705E−04 | −5.662E−05 |
| S8 | 0.000E+00 | −2.400E−02 | 1.000E−02 | 4.161E−03 | −2.460E−03 | 1.248E−03 | −2.393E−05 |
| S9 | 0.000E+00 | 3.300E−02 | −6.207E−03 | −1.000E−02 | 5.413E−03 | −1.233E−03 | 1.183E−04 |
| S10 | 0.000E+00 | 3.000E−02 | 7.889E−04 | 6.345E−04 | 3.711E−05 | −3.031E−05 | −9.451E−07 |
| S11 | 0.000E+00 | 4.000E−02 | −1.017E−03 | −3.695E−04 | 1.019E−04 | −4.078E−05 | −1.311E−06 |
| S12 | 0.000E+00 | −1.900E−02 | 2.100E−02 | −4.576E−03 | 9.085E−04 | −2.120E−04 | 1.745E−05 |
| S13 | 0.000E+00 | −6.200E−02 | 7.523E−03 | 5.749E−04 | −1.347E−04 | −7.337E−06 | 1.407E−06 |
| S14 | 0.000E+00 | −2.800E−02 | 4.754E−03 | −6.768E−04 | 5.945E−05 | −3.125E−06 | 5.668E−08 |

Figure 5:
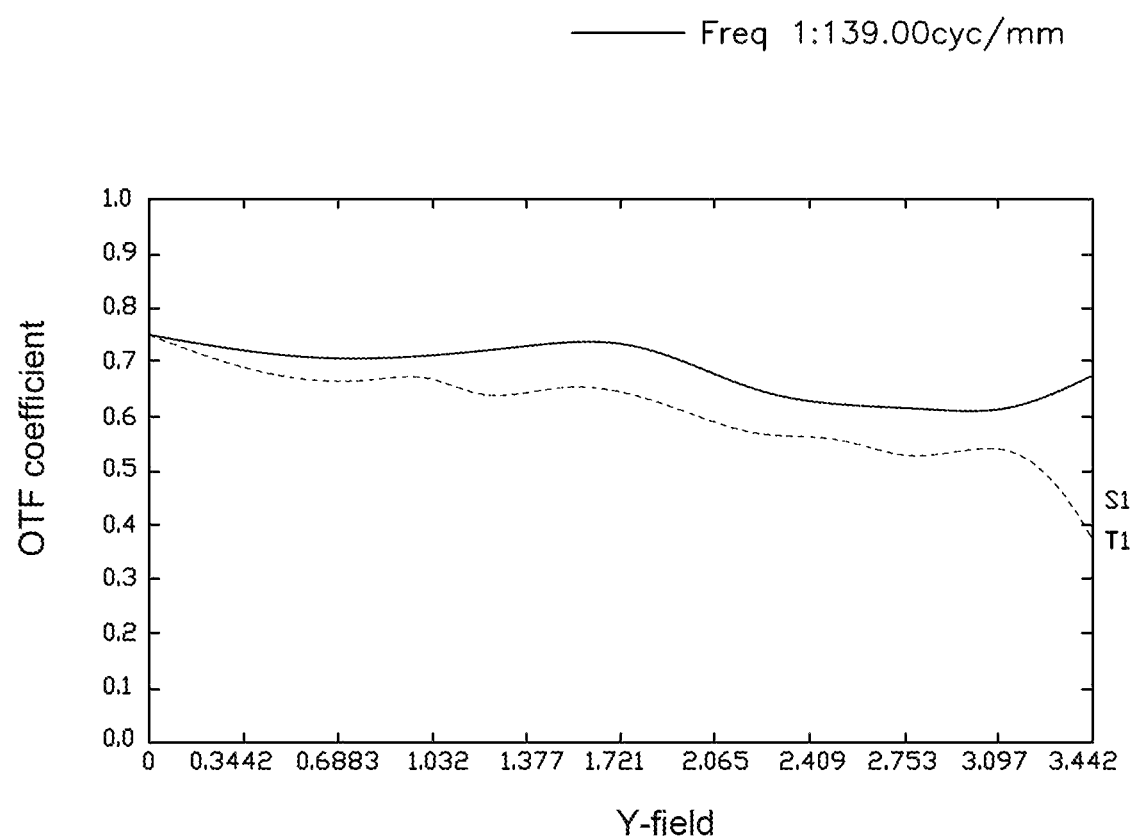
FIG. 5 is a diagram of MTF curves of the optical imaging lens of FIG. 4.
Figure 6:
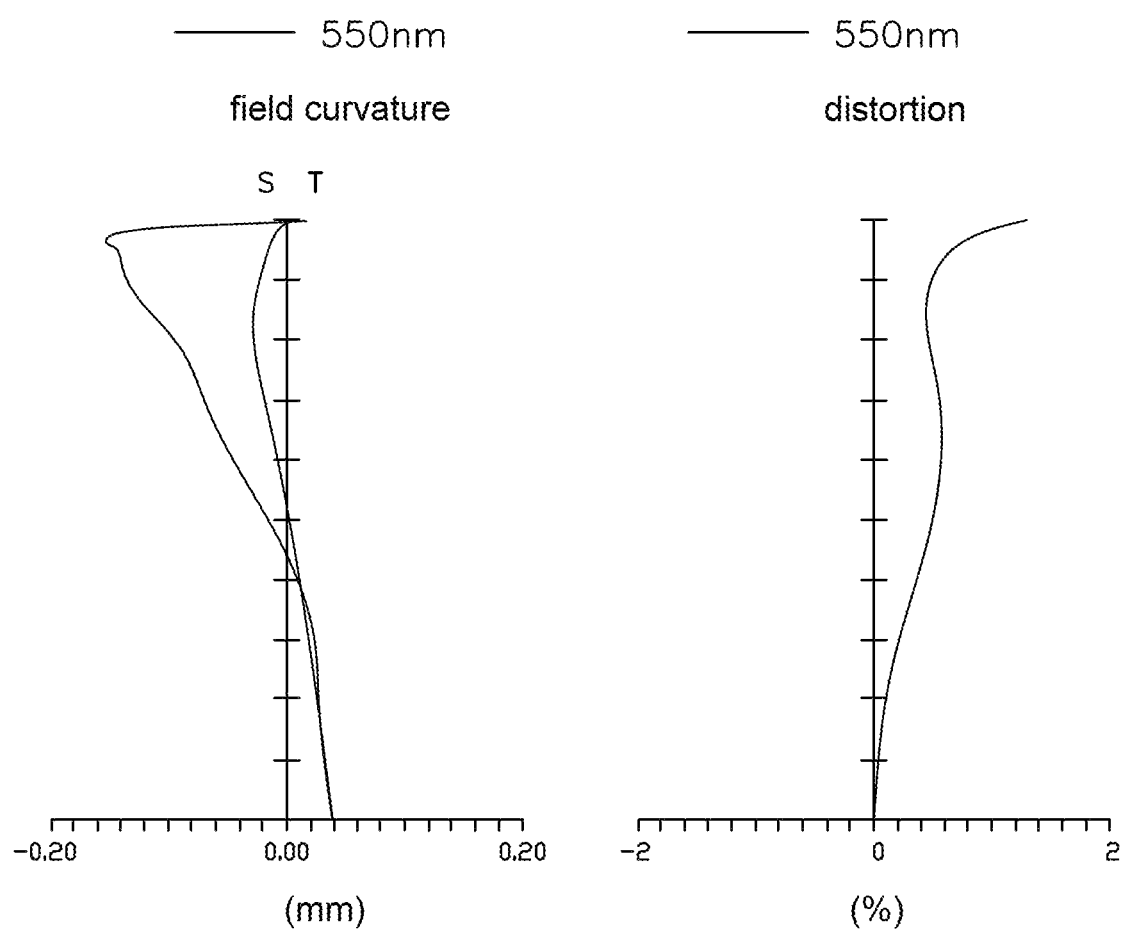
FIG. 6 shows field curvatures and distortions of the optical imaging lens of FIG. 4.

FIG. 5 is a diagram of MTF curves of the optical imaging lens 10, with a reference wavelength of 550 nm. The abscissa represents the Y-field offset angle, that is, the angle between the field of view of the optical system 10 and the optical axis. The ordinate represents the OTF coefficient. S1 and T1 represent curves at a spatial frequency of 139 p/mm, which can reflect the contrast characteristics and the resolution characteristics of the optical system 10. FIG. 6 show field curvatures and distortions of the optical imaging lens 10, with a reference wavelength of 550 nm.

As shown in FIGS. 5 and 6, the sagittal field curvature and meridional field curvature of the optical imaging lens 10 are controlled to be in a range of −0.2 mm to 0.2 mm, making the manufacture of the lenses easier and the cost reduced. The distortions of the optical imaging lens 10 are controlled to be in a range of 0% to 17%. Thus, the deformation by the optical imaging lens 10 in images captured is small. Thus, the optical imaging lens 10 has an improved imaging quality.

Third Embodiment

Figure 7:
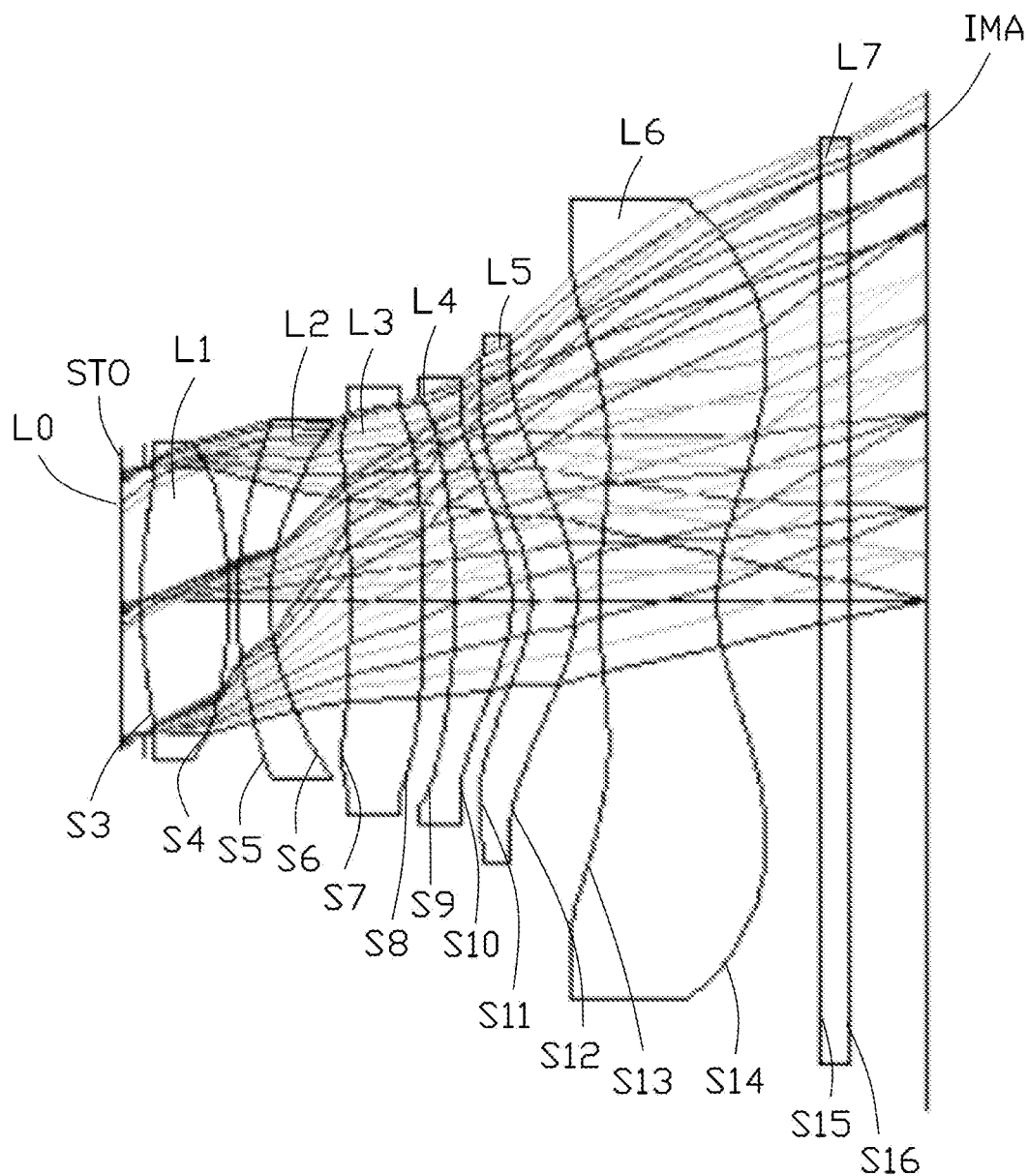
FIG. 7 is a diagrammatic view of a third embodiment of an optical imaging lens according to the present disclosure.

Referring to FIG. 7, the optical imaging lens 10 includes, from the object side to the image side, a stop STO, a first lens L1 with a positive refractive power, a second lens L2, a third lens L3, a fourth lens L4 with a negative refractive power, a fifth lens L5, a sixth lens L6 with a negative refractive power, and a filter L7.

The object surface S3 of the first lens L1 is convex near the optical axis, and the image surface S4 of the first lens L1 is convex near the optical axis. The object surface S5 of the second lens L2 is convex near the optical axis, and the image surface S6 of the second lens L2 is concave near the optical axis. The object surface S7 of the third lens L3 is concave near the optical axis, and the image surface S8 of the third lens L3 is convex near the optical axis. The object surface S9 of the fourth lens L4 is concave near the optical axis, and the image surface S10 of the fourth lens L4 is convex near the optical axis. The object surface S11 of the fifth lens L5 is concave near the optical axis, and the image surface S12 of the fifth lens L5 is convex near the optical axis. The object surface S13 of the sixth lens L6 is convex near the optical axis, the image surface S14 is of the sixth lens L6 concave near the optical axis. The object surface S13 and the image surface S14 of the sixth lens L6 are aspheric, and at least one of the object surface S13 and the image surface S14 has at least one inflection point.

When the optical imaging lens 10 is used, rays from the object side enter the optical imaging lens 10, successively pass through the stop STO, the first lens L1, the second lens L2, the third lens L3, the fourth lens L4, the fifth lens L5, the sixth lens L6, and the infrared filter L7, and finally converge on the imaging plane IMA.

Table 5 shows characteristics of the optical imaging lens 10. The reference wavelength of focal length, refractive index, and Abbe number is 555 nm, and the units of radius of curvature, thickness, and semi-diameter are in millimeters (mm).

TABLE 5

Third embodiment, FNO = 2.2, FOV = 75.5°

| surface | lens | type of surface | radius of curvature | thickness | material | refractive index | Abbe number | semi-diameter | conic constant |
|---|---|---|---|---|---|---|---|---|---|
| OBJ | | standard surface | infinite | infinite | | | | infinite | 0.000 |
| S1 | | standard surface | infinite | 0.160 | | | | 1.096 | 0.000 |
| STO | | standard surface | infinite | −0.016 | | | | 0.968 | 0.000 |
| S3 | first lens | aspheric | 3.293 | 0.641 | glass | 1.53 | 55.6 | 1.026 | −7.661 |
| S4 | | aspheric | −3.022 | 0.060 | | | | 1.148 | −27.766 |
| S5 | second lens | aspheric | 2.575 | 0.237 | glass | 1.67 | 19.2 | 1.310 | −13.865 |
| S6 | | aspheric | 1.384 | 0.585 | | | | 1.291 | −6.471 |
| S7 | third lens | aspheric | −30.000 | 0.530 | glass | 1.53 | 55.6 | 1.364 | −50.000 |
| S8 | | aspheric | −29.000 | 0.246 | | | | 1.560 | −30.000 |
| S9 | fourth lens | aspheric | −3.633 | 0.406 | glass | 1.53 | 55.6 | 1.494 | −11.538 |
| S10 | | aspheric | −1.141 | 0.140 | | | | 1.634 | −3.961 |
| S11 | fifth lens | aspheric | −0.956 | 0.334 | glass | 1.67 | 19.2 | 1.843 | −4.395 |
| S12 | | aspheric | −1.193 | 0.166 | | | | 1.925 | −4.650 |
| S13 | sixth lens | aspheric | 3.597 | 0.860 | glass | 1.53 | 55.6 | 2.364 | −12.609 |
| S14 | | aspheric | 1.375 | 0.752 | | | | 2.915 | −5.437 |
| S15 | infrared filter | standard surface | infinite | 0.210 | glass | 1.52 | 64.2 | 3.319 | 0.000 |
| S16 | | standard surface | infinite | 0.561 | | | | 3.378 | 0.000 |
| IMA | | standard surface | infinite | | | | | 3.706 | 0.000 |

Wherein, EFL is the effective focal length of the optical imaging lens 10 FNO is the F-number of the optical imaging lens 10, and FOV is the field of view of the optical imaging lens 10.

Table 6 shows the aspherical coefficients of the object surface and the image surface of each lens of the optical imaging lens 10.

TABLE 6

Third embodiment

| surface | K2 | K4 | K6 | K8 | K10 | K12 | K14 | K16 |
|---|---|---|---|---|---|---|---|---|
| S3 | 0.000E+00 | −6.428E−03 | −1.100E−02 | −3.100E−02 | 3.900E−02 | −4.300E−02 | 1.600E−02 | 0.000E+00 |
| S4 | 0.000E+00 | −2.400E−02 | −5.400E−02 | 2.500E−02 | 2.735E−03 | −1.400E−02 | 4.302E−03 | 0.000E+00 |
| S5 | 0.000E+00 | 1.500E−02 | −1.400E−02 | 1.700E−02 | −1.500E−02 | 9.117E−03 | −1.872E−03 | 0.000E+00 |
| S6 | 0.000E+00 | 4.300E−02 | −6.389E−03 | 3.602E−03 | −7.789E−03 | 6.657E−03 | −1.529E−03 | 0.000E+00 |
| S7 | 0.000E+00 | −5.600E−02 | 1.200E−02 | 1.500E−02 | −1.546E−03 | −1.334E−04 | −1.327E−04 | 0.000E+00 |

TABLE 6-continued

Third embodiment

| surface | K2 | K4 | K6 | K8 | K10 | K12 | K14 | K16 |
|---|---|---|---|---|---|---|---|---|
| S8 | 0.000E+00 | −2.600E−02 | −1.100E−02 | 3.850E−03 | −2.520E−03 | 1.279E−03 | 2.443E−05 | 0.000E+00 |
| S9 | 0.000E+00 | 3.000E−02 | −8.710E−03 | −1.000E−02 | 5.560E−03 | −1.276E−03 | 7.341E−05 | 0.000E+00 |
| S10 | 0.000E+00 | 3.100E−02 | 1.241E−03 | 7.347E−04 | 3.764E−05 | −4.013E−05 | −6.994E−06 | 0.000E+00 |
| S11 | 0.000E+00 | 4.300E−02 | −7.904E−04 | −3.701E−04 | 1.066E−04 | −3.754E−05 | 2.138E−06 | 0.000E+00 |
| S12 | 0.000E+00 | −2.000E−02 | 2.100E−02 | −4.383E−03 | 9.410E−04 | −2.092E−04 | 1.713E−05 | 0.000E+00 |
| S13 | 0.000E+00 | −5.800E−02 | 6.976E−03 | 5.748E−04 | −1.243E−04 | −6.241E−06 | 1.368E−06 | 0.000E+00 |
| S14 | 0.000E+00 | −3.300E−02 | 4.762E−03 | −6.719E−04 | 5.954E−05 | −3.130E−06 | 6.500E−08 | 0.000E+00 |

Figure 8:
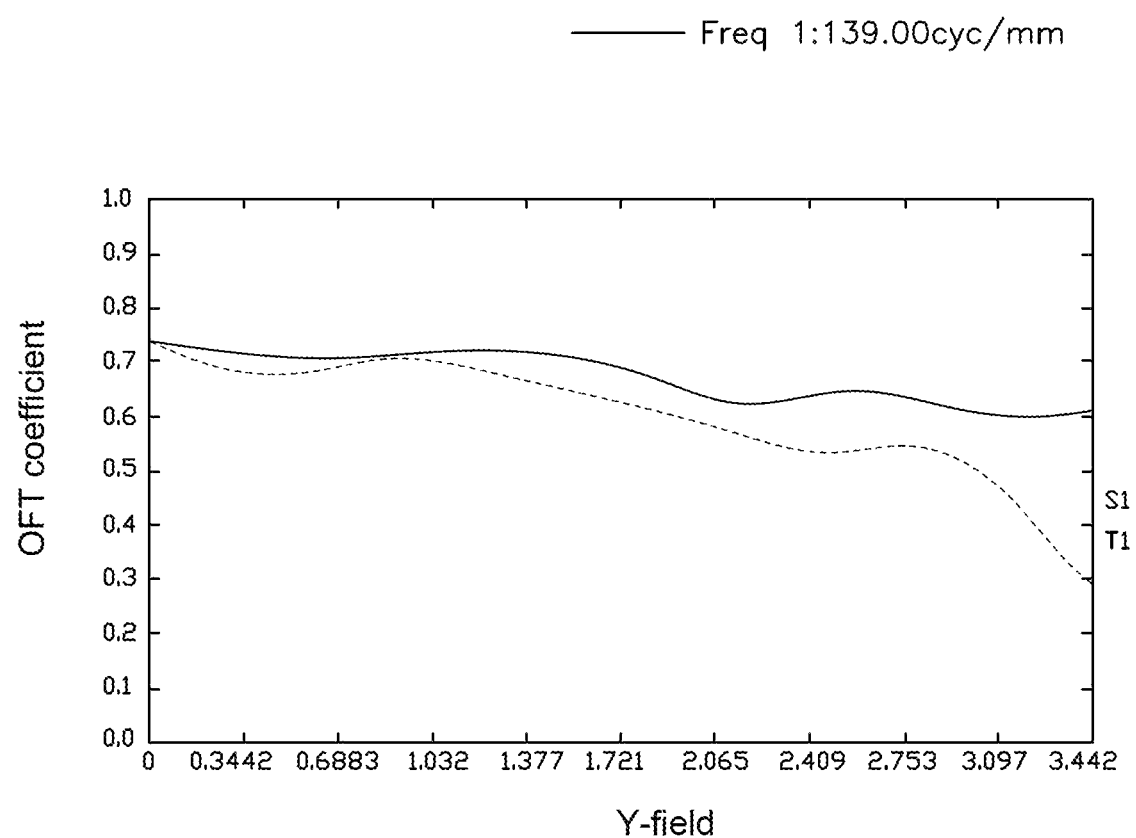
FIG. 8 is a diagram of MTF curves of the optical imaging lens of FIG. 7.
Figure 9:
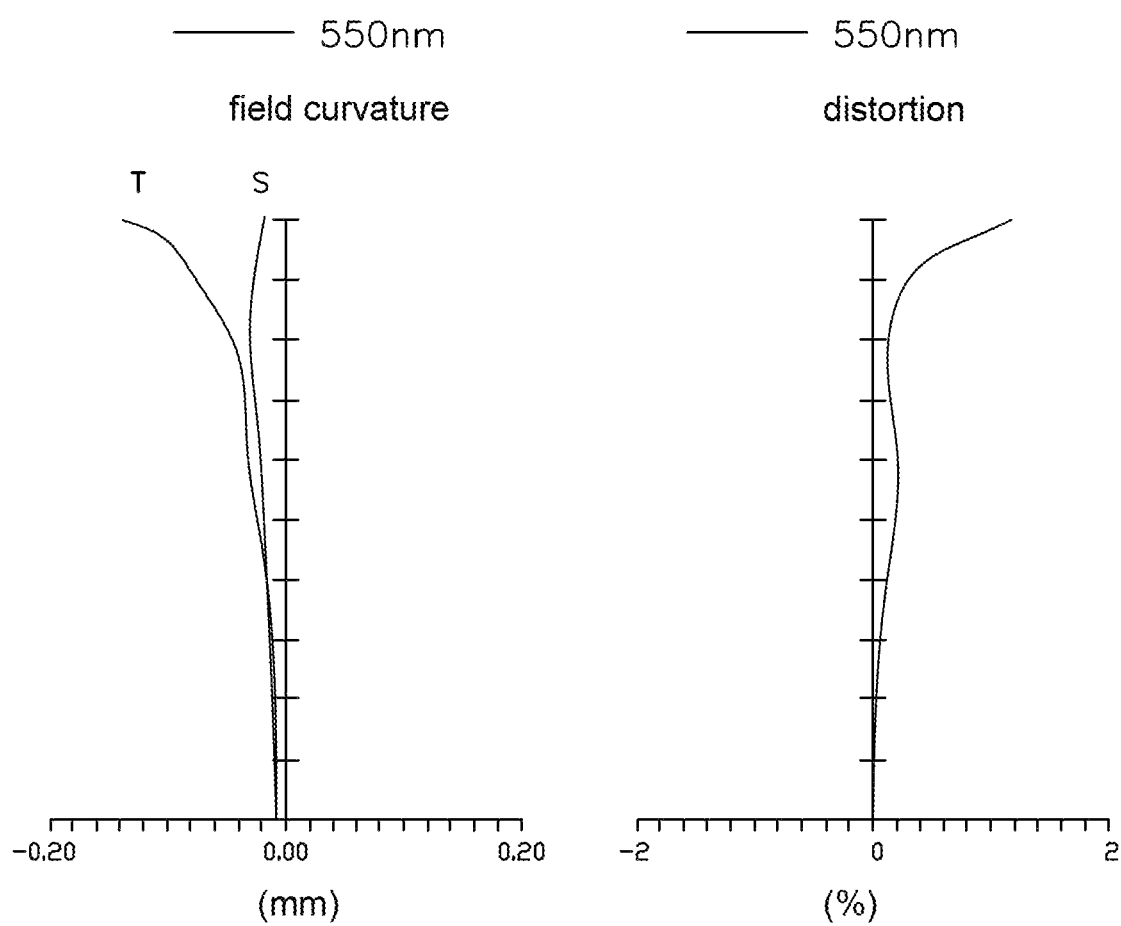
FIG. 9 shows field curvatures and distortions of the optical imaging lens of FIG. 7.

FIG. 8 is a diagram of MTF curves of the optical imaging lens 10, with a reference wavelength of 550 nm, with a reference wavelength of 550 nm. The abscissa represents the Y-field offset angle, that is, the angle between the field of view of the optical system 10 and the optical axis. The ordinate represents the OTF coefficient. S1 and T1 represent curves at a spatial frequency of 139 p/mm, which can reflect the contrast characteristics and resolution characteristics of the optical imaging lens 10. FIG. 9 shows field curvatures and distortions of the optical imaging lens 10, with a reference wavelength of 550 nm.

As shown in FIGS. 8 and 9, the sagittal field curvature and meridional field curvature of the optical imaging lens 10 are controlled to be in a range of −0.2 mm to 0.2 mm, making the manufacture of the lenses easier and the cost reduced. The distortions of the optical imaging lens 10 are controlled to be in a range of 0% to 17%. Thus, deformation by the optical imaging lens 10 in images captured is small. Thus, the optical imaging lens 10 has an improved imaging quality.

Table 7 shows the values of FNO/f6, f6/FOV, tan (HFOV)/SD11, SD22/SD12, (CT1+CT2)/(T12+T23), vd3−vd2, |RS7+RS8|/|RS7−RS8|, and |R5|/CT3 in the optical imaging lens 10 of the first to third embodiments.

TABLE 7

| | FNO/f6 | f6/FOV | tan(HFOV)/ SD11 | SD22/ SD12 |
|---|---|---|---|---|
| First embodiment | −2.9 | −0.06 | 1.057 | 1.192 |
| Second embodiment | −1.5 | −0.04 | 1.03 | 1.132 |
| Third embodiment | −0.9 | −0.02 | 0.755 | 1.125 |
| | (CT1+ CT2)/ (T12+ T23) | vd3 − vd2 | |RS7+ RS8|/ |RS7− RS8| | |R5|/ CT3 |
| First embodiment | 1.493 | 36.4 | 1.466 | 1.933 |
| Second embodiment | 1.553 | 36.4 | 1.828 | 1.796 |
| Third embodiment | 1.34 | 36.4 | 1.916 | 1.804 |

Figure 10:
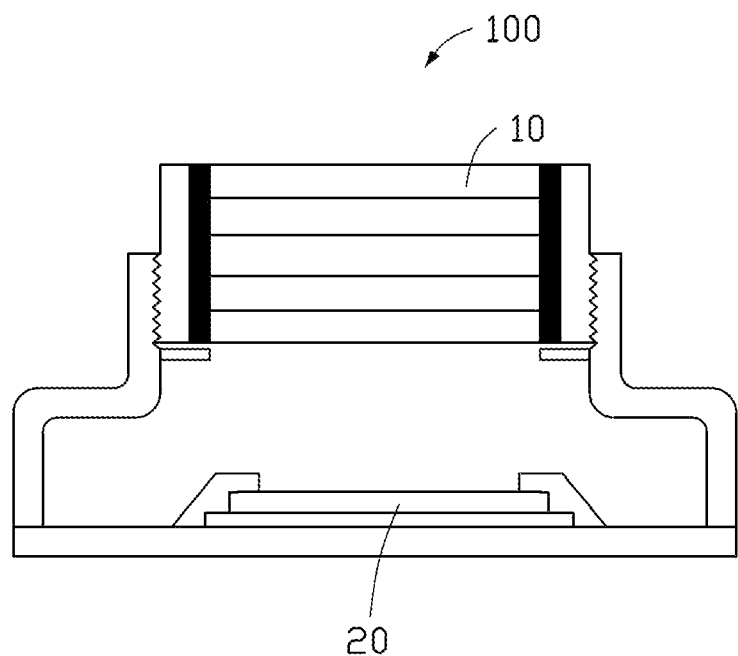
FIG. 10 is a diagrammatic view of an embodiment of an imaging module according to the present disclosure.

Referring to FIG. 10, an embodiment of an imaging module 100 is further provided, which includes the optical imaging lens 10 and an optical sensor 20. The optical sensor 20 is arranged on the image side of the optical imaging lens 10. The optical sensor 20 can be a CMOS (complementary metal oxide semiconductor) sensor or a charge coupled device (CCD).

Figure 11:
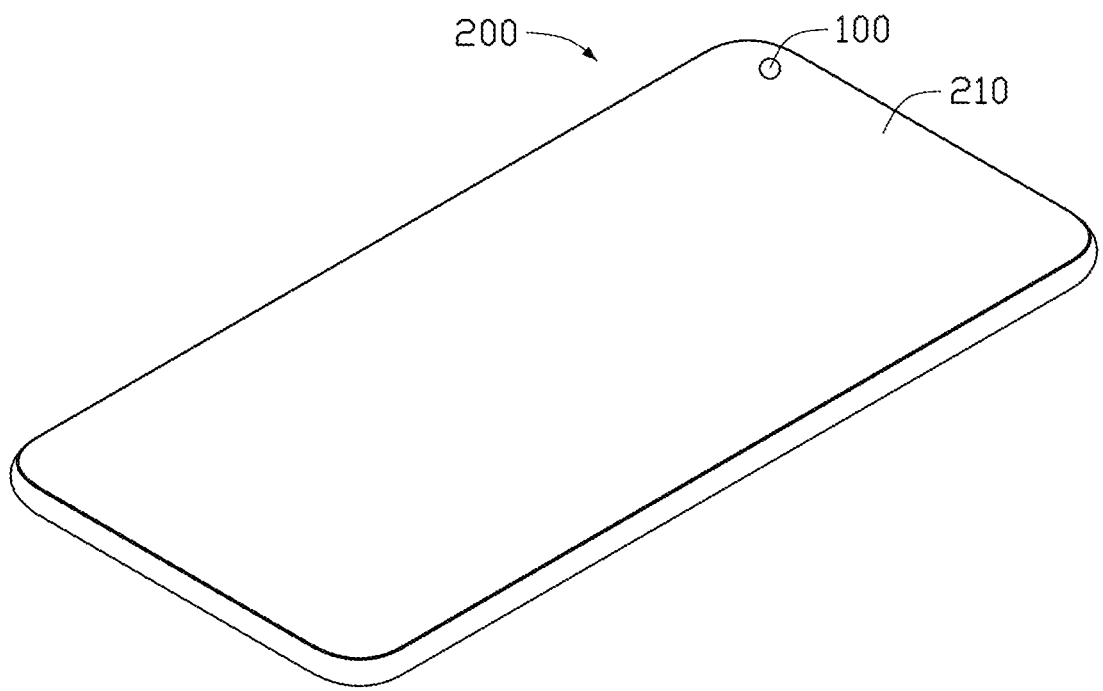
FIG. 11 is a diagrammatic view of an embodiment of an electronic device containing the imaging module according to the present disclosure.

Referring to FIG. 11, an embodiment of an electronic device 200 includes the imaging module 100 and a housing 210. The imaging module 100 is mounted on the housing 210. The electronic device 200 can be a tachograph, a smart phone, a tablet computer, a notebook computer, an e-book reader, a portable multimedia player (PMP), a portable telephone, a video telephone, a digital camera, a mobile medical device, a wearable device, etc.

Even though information and advantages of the present embodiments have been set forth in the foregoing description, together with details of the structures and functions of the present embodiments, the disclosure is illustrative only. Changes may be made in detail, especially in matters of shape, size, and arrangement of parts within the principles of the present exemplary embodiments, to the full extent indicated by the plain meaning of the terms in which the appended claims are expressed.

What is claimed is:

1. An optical imaging lens, from an object side to an image side, composed of:
   a first lens with a positive refractive power, a second lens, a third lens, a fourth lens with a negative refractive power, a fifth lens, and a sixth lens with a negative refractive power;
   wherein the optical imaging lens satisfies following formula:

$-3 \text{ mm}^{-1} < FNO/f6 < -0.1 \text{ mm}^{-1}, -0.065 \text{ mm}/° < f6/FOV < -0.03 \text{ mm}/°$;

wherein FNO is a F-number of the optical imaging lens, f6 is a focal length of the sixth lens, and FOV is a maximum field of view of the optical imaging lens;
   wherein the optical imaging lens further satisfies following formula:

$1.7 < |R5|/CT3 < 2.0$;

wherein R5 is a radius of curvature of an object surface of the third lens near an optical axis of the optical imaging lens, and CT3 is a distance from the object surface of the third lens to the image surface of the third lens along the optical axis.

2. The optical imaging lens of claim 1, wherein an image surface of the first lens is convex; an image surface of the third lens is convex; an image surface of the sixth lens is concave near an optical axis of the optical imaging lens; an object surface and the image surface of the sixth lens are aspherical, and at least one of the object surface and the image surface of the sixth lens has at least one anti curved point.

3. The optical imaging lens of claim 1, further satisfying following formula:

$0.5 \text{ mm}^{-1} < \tan(HFOV)/SD11 < 1.5 \text{ mm}^{-1}$;

wherein HFOV is half of the maximum field of view of the optical imaging lens, and SD11 is an effective semi-diameter of an object surface of the first lens.

4. The optical imaging lens of claim 1, further satisfying following formula:

$1.12 < SD22/SD12 < 1.2$;

wherein SD22 is an effective semi-diameter of the image surface of the second lens, and SD12 is an effective semi-diameter of the image surface of the first lens.

5. The optical imaging lens of claim 1, further satisfying following formula:

$$1.3<(CT1+CT2)/(T12+T23)<1.6;$$

wherein CT1 is a distance from an object surface of the first lens to the image surface of the first lens along an optical axis of the optical imaging lens, CT2 is a distance from an object surface of the second lens to an image surface of the second lens along the optical axis, T12 is a distance between the image surface of the first lens and the object surface of the second lens along the optical axis, and T23 is a distance between the image surface of the second lens and an object surface of the third lens along the optical axis.

6. The optical imaging lens of claim 1, further satisfying following formula:

$$35<vd3-vd2<40;$$

wherein vd2 is an Abbe number of the second lens, and vd3 is an Abbe number of the third lens.

7. The optical imaging lens of claim 1, further satisfying following formula:

$$1.4<|RS7+RS8|/|RS7-RS8|<2.0;$$

wherein RS7 is a radius of curvature of an object surface of the fourth lens near an optical axis of the optical imaging lens, and RS8 is a radius of curvature of an image surface of the fourth lens near the optical axis.

8. An imaging module, comprising:
an optical imaging lens, from an object side to an image side, composed of a first lens with a positive refractive power, a second lens, a third lens, a fourth lens with a negative refractive power, a fifth lens, and a sixth lens with a negative refractive power; and
an optical sensor arranged on the image side of the optical imaging lens;
wherein the optical imaging lens satisfies following formula:

$$-3\ mm^{-1}<FNO/f6<-0.1\ mm^{-1}, -0.065\ mm/°<f6/FOV<-0.03\ mm/°;$$

wherein FNO is a F-number of the optical imaging lens, f6 is a focal length of the sixth lens, and FOV is a maximum field of view of the optical imaging lens;
wherein the optical imaging lens further satisfies following formula:

$$1.7<|R5|/CT3<2.0;$$

wherein R5 is a radius of curvature of an object surface of the third lens near an optical axis of the optical imaging lens, and CT3 is a distance from the object surface of the third lens to the image surface of the third lens along the optical axis.

9. The imaging module of claim 8, wherein an image surface of the first lens is convex; an image surface of the third lens is convex; an image surface of the sixth lens is concave near an optical axis of the optical imaging lens; an object surface and the image surface of the sixth lens are aspherical, and at least one of the object surface and the image surface of the sixth lens has at least one anti curved point.

10. The imaging module of claim 8, wherein the optical imaging lens further satisfies following formula:

$$0.5\ mm^{-1}<\tan(HFOV)/SD11<1.5\ mm^{-1};$$

wherein HFOV is half of the maximum field of view of the optical imaging lens, and SD11 is an effective semi-diameter of an object surface of the first lens.

11. The imaging module of claim 8, wherein the optical imaging lens further satisfies following formula:

$$1.12<SD22/SD12<1.2;$$

wherein SD22 is an effective semi-diameter of the image surface of the second lens, and SD12 is an effective semi-diameter of the image surface of the first lens.

12. The imaging module of claim 8, wherein the optical imaging lens further satisfies following formula:

$$1.3<(CT1+CT2)/(T12+T23)<1.6;$$

wherein CT1 is a distance from an object surface of the first lens to the image surface of the first lens along an optical axis of the optical imaging lens, CT2 is a distance from an object surface of the second lens to an image surface of the second lens along the optical axis, T12 is a distance between the image surface of the first lens and the object surface of the second lens along the optical axis, and T23 is a distance between the image surface of the second lens and an object surface of the third lens along the optical axis.

13. The imaging module of claim 8, wherein the optical imaging lens further satisfies following formula:

$$35<vd3-vd2<40;$$

wherein vd2 is an Abbe number of the second lens, and vd3 is an Abbe number of the third lens.

14. The imaging module of claim 8, wherein the optical imaging lens further satisfies following formula:

$$1.4<|RS7+RS8|/|RS7-RS8|<2.0;$$

wherein RS7 is a radius of curvature of an object surface of the fourth lens near an optical axis of the optical imaging lens, and RS8 is a radius of curvature of an image surface of the fourth lens near the optical axis.

15. An electronic device, comprising:
a housing; and
an imaging module mounted on the housing, the imaging module comprising:
an optical imaging lens, from an object side to an image side, composed of a first lens with a positive refractive power, a second lens, a third lens, a fourth lens with a negative refractive power, a fifth lens, and a sixth lens with a negative refractive power; and
an optical sensor arranged on the image side of the optical imaging lens;
wherein the optical imaging lens satisfies following formula:

$$-3\ mm^{-1}<FNO/f6<-0.1\ mm^{-1}, -0.065\ mm/°<f6/FOV<-0.03\ mm/°;$$

wherein FNO is a F-number of the optical imaging lens, f6 is a focal length of the sixth lens, and FOV is a maximum field of view of the optical imaging lens;
wherein the optical imaging lens further satisfies following formula:

$$1.7<|R5|/CT3<2.0;$$

wherein R5 is a radius of curvature of an object surface of the third lens near an optical axis of the optical imaging lens, and CT3 is a distance from the object surface of the third lens to the image surface of the third lens along the optical axis.

16. The electronic device of claim 15, wherein an image surface of the first lens is convex; an image surface of the third lens is convex; an image surface of the sixth lens is concave near an optical axis of the optical imaging lens; an object surface and the image surface of the sixth lens are aspherical, and at least one of the object surface and the image surface of the sixth lens has at least one anti curved point.

17. The electronic device of claim 15, wherein the optical imaging lens further satisfies following formula:

$$0.5 \text{ mm}^{-1} < \tan(HFOV)/SD11 < 1.5 \text{ mm}^{-1};$$

wherein HFOV is half of the maximum field of view of the optical imaging lens, and SD11 is an effective semi-diameter of an object surface of the first lens.

18. The electronic device of claim 15, wherein the optical imaging lens further satisfies following formula:

$$1.12 < SD22/SD12 < 1.2;$$

wherein SD22 is an effective semi-diameter of the image surface of the second lens, and SD12 is an effective semi-diameter of the image surface of the first lens.

* * * * *